Sept. 15, 1959  J. W. WHALEN  2,903,897
VARIABLE DRIVE TRANSMISSION
Filed Sept. 27, 1957  3 Sheets-Sheet 1
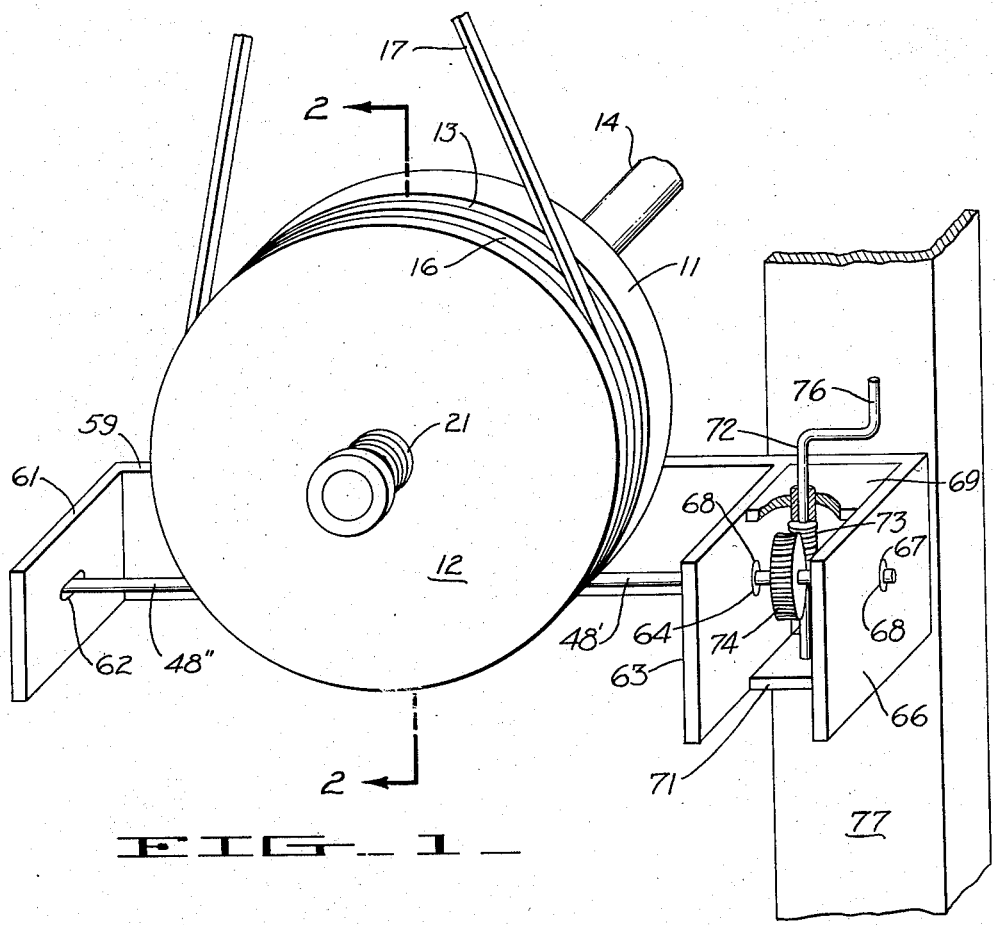
FIG_1_
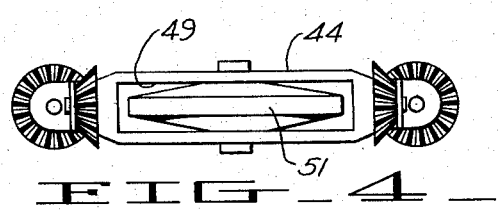
FIG_4_
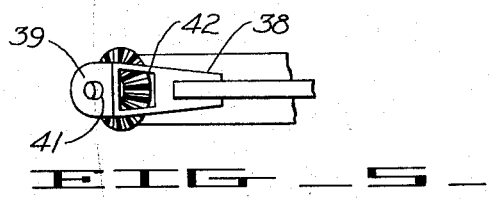
FIG_5_
INVENTOR.
James W. Whalen
BY
William D. Hager
ATTORNEY Sept. 15, 1959   J. W. WHALEN   2,903,897
VARIABLE DRIVE TRANSMISSION
Filed Sept. 27, 1957   3 Sheets-Sheet 2
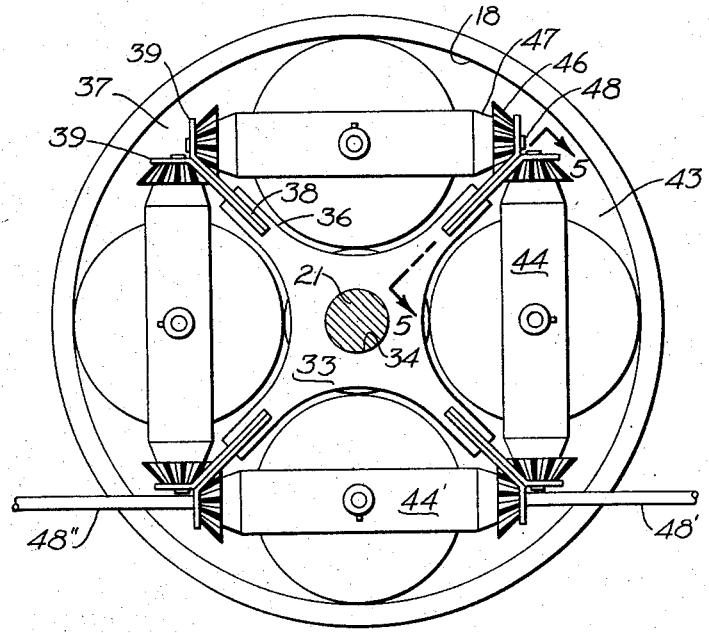
FIG_3_
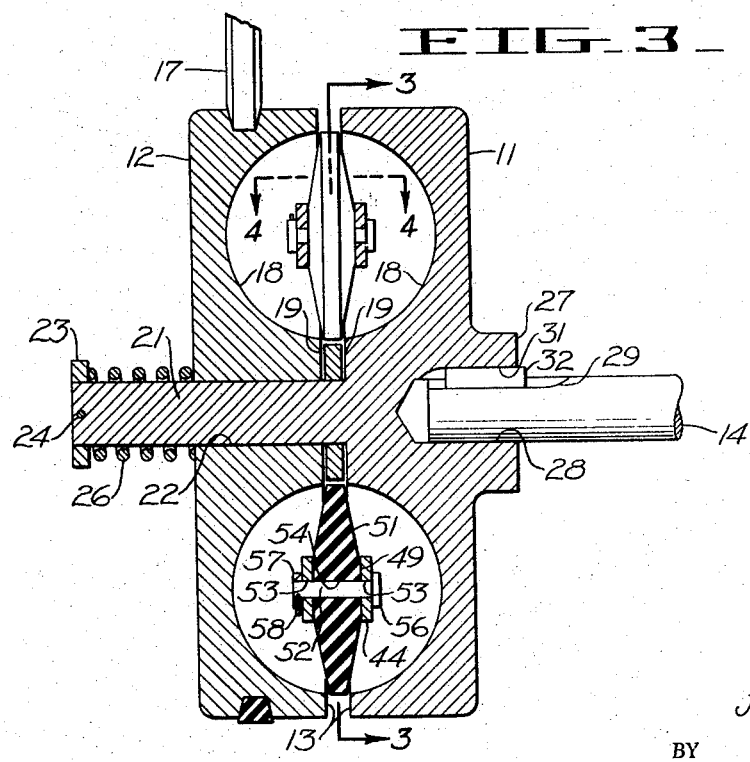
FIG_2_
INVENTOR.
James W. Whalen
BY William D. Hager
ATTORNEY

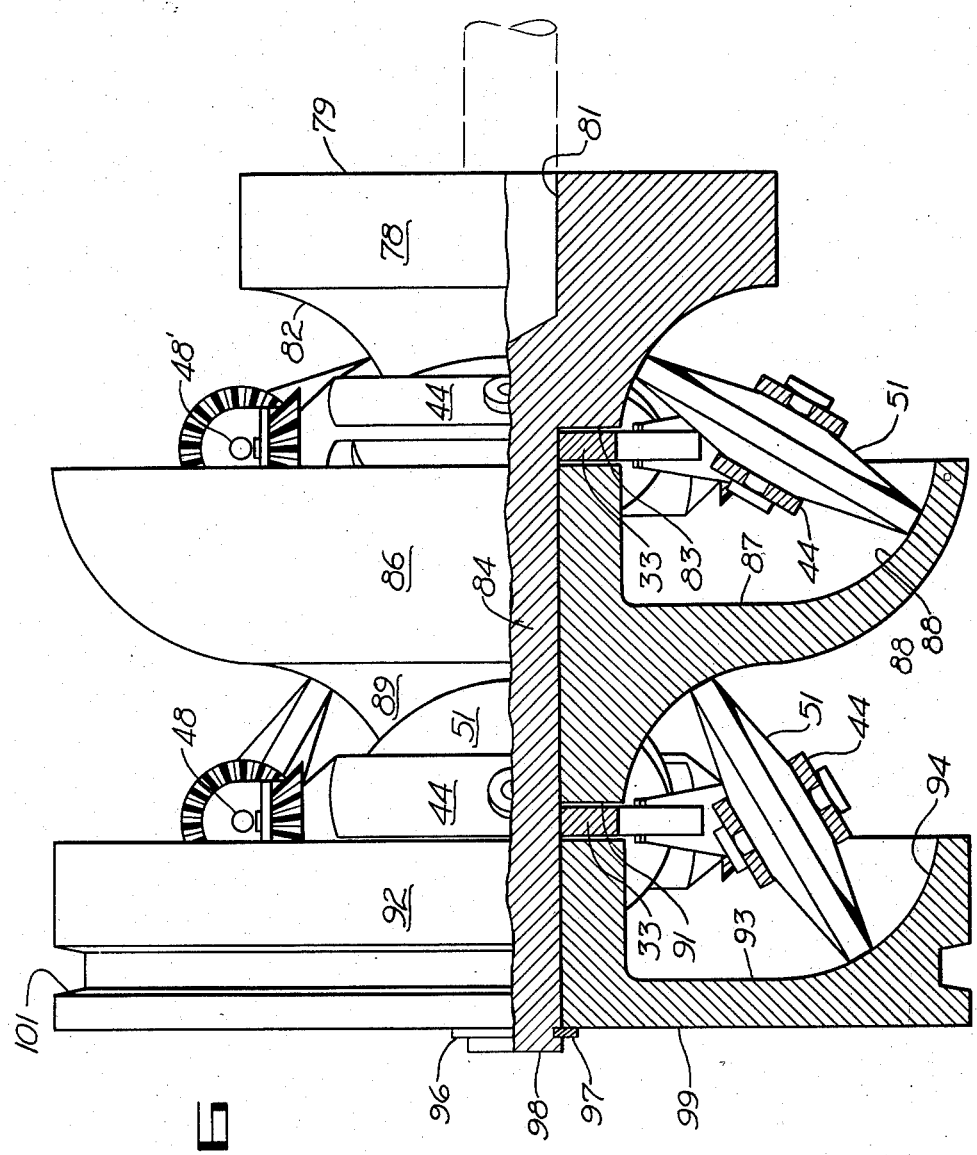

United States Patent Office 2,903,897
Patented Sept. 15, 1959

2,903,897

VARIABLE DRIVE TRANSMISSION

James W. Whalen, San Lorenzo, Calif.

Application September 27, 1957, Serial No. 686,644

3 Claims. (Cl. 74—200)

The present invention relates to torque transmissions and more particularly to friction drive change-speed gears of the class providing for stepless changes in the drive ratio between rotary driving and driven members.

Mechanisms for varying the drive ratio between a rotating drive shaft and a rotating driven shaft are extensively used in a variety of applications. Such mechanisms are, for example, widely used to vary the turning speed of machine tools in accordance with the diameter and hardness of the particular material undergoing machining. Another typical application is that of varying the drive ratio between an engine and a heavy rotary load such as a generator. In the absence of a change speed mechanism, sudden application of the full load of the generator to the engine would result in stalling or breakage. Through the use of a variable torque transmission, however, the generator may be gradually accelerated to the required speed. Concurrently with the gradual acceleration of the load, the applied torque is progressively decreased from a maximum initial value which gradual torque decrease results in a high degree of mechanical efficiency for the system. Smaller variable speed transmissions are utilized in servo control systems and in a number of diverse other applications.

In many applications of variable drive transmissions it is preferable, and in some instances mandatory, that changes in drive ratio be accomplished in an infinitely variable manner, that is the change in drive ratio should be continuous, smooth, and without interruption in the connection between driving and driven member as opposed to changing the drive ratio in definite increments or steps. While a wide variety of mechanisms have been developed for accomplishing the foregoing, such mechanisms have heretofore been characterized by certain prominent disadvantages. These devices have tended to be complex and bulky resulting in a proneness to breakage and a high degree of inherent inertia, the latter factor acting to resist applied torque, prevent sudden speed changes, and to generally lower the efficiency of the drive. Many such transmissions are limited in the range through which drive ratio changes may be accomplished, and some are characterized by a tendency to drift and to slippage.

Notably, most such mechanism fail to provide a neutral position in which driving member and driven member are disconnected. Some varieties of continuously variable speed changing mechanism which do provide a neutral position do so by traversing the driven gear to the central position on a perpendicular driving gear. In this condition slippage between the two gears is forced and the inevitable result is excessive wear on the driven gear and pitting at the central point on the driving gear.

Provision for complete disconnection of the driving and driven members is an important and highly advantageous feature of the present invention. Moreover, in the novel structure to be herein described, the neutral position immediately precedes the minimum drive ratio with reference to adjustment of the control element.

Thus, by turning the control element from the neutral position, maximum torque is immediately applied to the load, further turning of the control element acting to continuously decrease the torque and concurrently increase the speed of the driven member. The advantages of the foregoing in such applications as starting heavy loads are apparent.

The foregoing problems heretofore associated with speed change mechanisms, are met in the present invention by a structure of the class having a circular driving member and a matching circular driven member disposed coaxially therewith. The juxtaposed faces of the driving and driven members are each provided with a coaxial groove of toroidal cross-section. A novel system of torque transfer discs is disposed between the driving and driven members each component torque transfer disc contacting the grooved portions of both driving and driven members to transfer drive therebetween. By means of the unique suspension system to be herein described the torque transfer discs may be simultaneously rotated about their own diameters to systematically vary the drive ratio between the driving and driven members. The driving and driven members are positioned to be separated a distance exceeding the width of the torque transfer disc so that as the discs are rotated into parallelism with the driving and driven members, no driving connection exists and the transmission is in neutral.

The torque transfer disc suspension system is substantially entirely contained between the driving and driven members, the only externally projecting elements being a small control rod and a small stabilizing rod. Thus the bulk of the assembly is kept to a minimum and no stationary housing for the transmission need necesarily be used. It will be found, moreover, that the apparatus is particularly adapted to the cascading of more than one stage of torque transfer discs whereby speed reductions of an extremely high order may be achieved.

From the neutral position the torque transfer discs may be rotated to immediately apply maximum torque and minimum speed to the driven member, rotation of the discs in the opposite sense acting to immediately apply minimum torque and maximum speed to the driven member. The former condition is, of course, the more commonly desired mode of operation. Continued rotation of the torque transfer discs into parallelism with the axis of the driving and driven member produces a 1:1 drive ratio and further rotation reverses the drive from step down to step up or the opposite. Thus by simple adjustment of the control rod, while the drive is in operation, the drive ratio may be progressively changed from neutral through high step down to unity and on to high step up. Any drive condition which might conceivably be desired is easily effected with a minimum of effort and without interruption in the operation of the drive.

It is therefore an object of the present invention to provide a highly improved torque transmission means of the class in which the drive ratio between a driving member and a driven member may be varied in a stepless manner.

It is an object of this invention to provide a speed varying drive transmission characterized by simplicity, high efficiency and minimum bulk.

It is a further object of the invention to provide means for varying the drive ratio between a driving and driven member which means is characterized by a neutral position in which no torque transmitting connection between driving and driven member exists.

Still a further object of the invention is to provide friction gearing means with which the drive ratio between driving and driven members may be changed by a readily manipulatable control means, such friction gearing being characterized by a neutral position immediately preceding a position of maximum applied torque with respect to adjustment of the control means.

An object of this invention is to provide a change speed gear mechanism which can be continuously varied from a neutral position through a wide range of step down gear ratios to a one to one gear ratio and through a wide range of step up gear ratios without interrupting the drive at any time.

It is an important object of the present invention to provide a continuously variable torque transmission of the class having coaxial driving and driven members and intermediate torque transfer means in which said intermediate torque transfer means is substantially entirely contained in the space between said driving and driven members.

A further object of the invention is to provide a stepless variable speed rotary drive system of the type having coaxial driving and driven members and interposed drive transfer means which drive system is particularly adapted to construction in a plurality of stages to obtain extreme step down drive ratios, such construction with a plurality of stages being accomplished with minimum increase in bulk and complexity.

The invention, both as to its organization and method of operation, together with further objects and advantages thereof, will best be understood by reference to the following specification taken in conjunction with the accompanying drawing, in which:

Figure 1 is a perspective view showing the exterior aspects of a first embodiment of the invention and showing means for controllably effecting changes in the drive ratio of the apparatus.

Figure 2 is a sectional veiw of the invention taken along line 2—2 of Figure 1 and showing the driving member, driven member, and novel structure for transmitting torque therebetween, Figure 3 is a cross-sectional view, taken along line 3—3 of Figure 2, further clarifying the structure of the interior torque transmitting means, Figure 4 is a view taken along line 4—4 of Figure 2, Figure 5 is a sectional view taken along line 5—5 of Figure 3, and Figure 6 is a view, partially in section, showing a second embodiment of the invention which embodiment is a two stage speed reduction mechanism.

Referring now to the drawing and more particularly to Figure 1 thereof, there is shown a rotary driving member 11 and rotary driven member 12, each having a generally cylindrical exterior contour, the two members being disposed along a common axis and being separated by a small gap 13. Driving member 11 is secured coaxially to the end of a rotating drive input shaft 14 which both supports and turns the member. Driven member 12 is provided with a circumferential groove 16 of V-shaped cross section into which a V-belt 17 is fitted for the purpose of connecting the transmission to the load to be driven. It should be understood that the foregoing input and output means are but one example. Both input and output can be accomplished by means of shafts or belts or by gear teeth on the periphery of the driving and driven members, the preferred method being determined by the nature of the apparatus with which the invention is to be used.

Referring now to Figure 2 there are shown matching annular grooves 18 in the juxtaposed faces 19 of driving member 11 and driven member 12, such grooves being coaxial with the drive axis of the members and forming, in conjunction, a toroidal chamber between the two members. It will further be seen, by reference to Figure 2, that driving member 11 is provided with a cylindrical axial projection 21 transpierced through an axial bore 22 in driven member 12, the projection being of sufficient length to pass completely through the driven member and to extend a substantial distance out from the far side thereof. An annular stop 23 is secured coaxially to the end of projection 21 by means of a transverse pin 24, and a compression spring 26 is disposed coaxially around the terminal section of the projection, such spring bearing against annular stop 23 and against the face of driven member 12 thus urging the driving member 11 and driven member together.

For purposes of securing the assembly on the end of drive input shaft 14, driving member 11 is provided with a relatively short second axial projection 27 on the side opposite from projection 21, such second projection being of greater diameter than the first and having an axial bore 28 into which the extremity of the input shaft is fitted. To lock the driving member 11 on the shaft 14, the terminal portion of the shaft and the interior of bore 28 are provided with longitudinal slots 29 and 31 respectively into which a rectangular key 32 is fitted.

Referring now to Figures 2 and 3 in conjunction, there is shown novel means for transmitting torque between the driving member 11 and driven member 12, such means being substantially entirely contained within and between the two members. Such means comprises a radially spoked axle support element 33 centered between driving member 11 and driven member 12, projection 21 being passed through a central opening 34 in the axle support element. The axle support element thus serves to establish the gap 13 between the driving and driven members and is free to remain stationary while the other members rotate. Axle support element 33 is, in this embodiment, provided with four equiangularly spaced arms 36 the use of four such arms resulting in optimum use of the available space for the torque transmitting mechanism. It will be understood, however, that other designs are feasible and that any number of arms greater than two may be utilized. The arms 36 extend outward along radii of the assembly a distance approximately half the radius of the driving and driven members.

Extending longitudinally from each arm 36 of the axle support member is a fork 37 comprised of a wide flat body portion 38 aligned at right angles to the axle support member which body portions is bifurcated at the end to form two bearing members 39 which bearing members form a ninety degree angle bisected by the plane of body portion 38. The arms 36 of axle support 33 and the forks 37 are proportioned so that a line drawn through the center of each bearing member 39 to the center of the parallel bearing member of the neighboring fork is tangent to the circular centerline of the toroidal chamber formed by the grooves 18. As best shown in Figure 5, each bearing member 39 is transpierced at the center by an aperture 41 and the section of body portion 38 nearest bearing members 39 is transpierced by an expansive opening 42.

Referring now again to Figure 3, there is shown torque transfer disc assemblies 43 disposed within the toroidal chamber formed by grooves 18, one being disposed between each neighboring pair of arms 36 of axle support element 33. Each such torque transfer disc assembly 43 includes a pivot axle element 44 of rectangular cross section which extends between the bearing members 39 of neighboring forks 37. Secured coaxially against each end of pivot axles 44 is a forty-five degree bevel gear 46, the gears of adjacent pivot axles being meshed through openings 42 in the body portion 38 of forks 37. The end portions 47 of the pivot axles 44 adjacent gears 46 are inwardly tapered towards the gear to avoid interference with forks 37. To hold the axles 44 and attached gears 46 in place, a short projection 48 extends forward from the center of each gear through the central aperture 41 of bearing member 39. As a consequence of the foregoing structure, the four pivot axles 44 form a rectangular framework tangent at four points to the center line of the toroidal chamber formed by grooves 18. Each such pivot axle is rotatable about its own axis and the four pivot axles are constrained by gears 46 to rotate simultaneously.

As best shown in Figure 4, pivot axles 44 are formed with a longitudinal slot 49 extending substantially the entire length of the axle and transpierced entirely through the axle. Referring now again to Figure 2, there is shown a circular torque transfer disc 51 rotatably mounted within slot 49 of each pivot axle 44, each such disc having an axial width substantially equivalent to the width of slot 49 and being tapered radially to a rim width slightly less than the width of the gap 13 between the driving member 11 and driven member 12. Each such disc 51 has a diameter equal to the cross sectional diameter of the toroid defined by the walls of grooves 18 in the driving member 11 and driven member 12, thus the discs upon being suitably oriented will extend between the two members and bear against each causing rotation of one to be transmitted to the other. It will be found preferable, for securing maximum traction, to form the discs 51 of slightly resilient material such as hard rubber where the surfaces of grooves 18 are formed of metal, the best combinations of material for this purpose being well known within the art.

Discs 51 are mounted within the pivot axles 44 by means of transverse pins 52, one transpiercing each axle through central apertures 53 therein. Each such pin 52 passes through an axial bore 54 in the corresponding disc 51, the discs being free to revolve around the pins. To lock the pins to the pivot axles 44, the pins 52 are provided with an enlarged head 56 at one end and an annular collar 57 with set screw 58 at the opposite end.

Considering now mechanism for rotating the pivot axles 44 and thus the torque transmitting discs 51, with reference to Figure 3, it will be observed, that the axial projections 48 which mount one of the four pivot axles on forks 37 are of sufficient length to project a substantial distance outward from between the driving member 11 and driven member 12 in a generally chordal alignment therewith. In Figure 3 such elongated extensions are designated 48' and 48" and project from either end of the lowermost pivot axle 44' in a lateral direction, the choice of a particular pivot axle as the driven element being, however, arbitrary.

Referring now again to Figure 1, there is shown means for securing the ends of the projecting rods 48' and 48" and for controllably rotating the rods, thus serving the dual functions of preventing rotation of the interior torque transmitting means about shaft 21 and of adjusting the drive ratio of the transmission. Such means here comprises a brace 59 passing across the exterior face of driving member 11 in parallel relationship to rods 48' and 48". The end of brace 59 adjacent rod 48" is provided with a ninety degree bend forming a right angled bracket 61 which bracket is provided with an aperture 62 through which the rod passes. Inasmuch as the rod 48" functions only as a stabilizer to prevent rotation of the internal components of the transmission assembly, the aperture 62 in bracket 61 is preferably elongated in a direction parallel to the drive axis of the assembly as established by drive input shaft 14. Thus the rod 48" is held fast with respect to any tendency to rotate about the drive axis but is free to adjust itself in a direction parallel to the drive axis thereby eliminating any tendency to binding. Thus, torque transfer disc assemblies 43 are free to find exact centers in the toroidal chamber.

The opposing end of brace 59 is provided with a double bracket structure comprised of a first bracket member 63 at right angles to the brace and having an aperture 64 through which rod 48' passes and a second similar bracket member 66 spaced further along the brace and similarly provided with an aperture 67 through which the end of the rod 48' passes. Since rod 48" provides stabilization for the internal components of the assembly, rod 48' need not be precisely constrained with respect to lateral movement, therefore it will be found advantageous to form the apertures 64 and 67, in bracket members 63 and 66, with a larger diameter than that of rod 48' and to provide bearings 68 in the apertures which bearings are formed of resilient material. Such construction allows the rod 48' to adjust itself laterally eliminating any binding in the mechanism.

To complete the bracket structure, a plate 69 is disposed between the upper edges of bracket members 63 and 66 which plate terminates at substantially one half the distance from brace 59 to the ends of the brackets. A similar plate 71 is disposed between the lower edges of the bracket members 63 and 66. A vertical crank shaft 72 is journalled in plates 69 and 71, a worm gear 73 being secured on the shaft between the two plates. Worm gear 73 engages a worm wheel 74 secured coaxially to rod 48' between bracket members 63 and 66. For purposes of turning worm gear 73, and thus for adjusting the drive ratio of the transmission, a crank 76 attaches to the upper end of crank shaft 72.

Since the foregoing structure must be held stationary as the transmission is operated, brace 59 is secured to an adjacent fixed mounting 77 the nature of which will be dependent upon the apparatus with which the transmission is used. If the transmission were used to control the turning speed of a lathe, for example, mounting 77 might constitute a portion of the lathe bench.

The foregoing stabilization and control means are an illustrative design in which binding and friction within the mechanism are minimized. It will be understood, however, that varying designs are possible. Rod 48" may be eliminated, for example, and rod 48' used for both stabilization and speed ratio control. Brace 59 may be eliminated if suitable stationary structure is available to which the brackets 61, 63, and 66, may be attached. Where more precise regulation of the transmission speed ratio is required, crank 76 may be replaced with a control knob and pointer moving over the surface of a calibrated dial.

Considering now the operation of the above described embodiment of the invention, with reference to Figures 1, 2, and 3, it may be seen that suitable adjustment of crank 76 will cause the pivot axles 44 to rotate carrying torque transfer discs 51 to a selected angular alignment with respect to the axis of the system, the angular alignment of all four discs 51 being identical at all times since all four pivot axles 44 are locked for simultaneous rotation by bevel gears 46. In any but the vertical position, torque transfer discs bear against both driving member 11 and driven member 12 and thus rotation of one is transferred to the other with a speed ratio determined by the angular alignment of the discs 51.

With the discs 51 aligned at right angles to the drive axis, the transmission is in a neutral position since no driving connection exists between driving member 11 and driven member 12. Rotation of crank 76 to tilt the outermost edge of the discs 51 away from driving member 11 establishes the driving connection, in a condition of high speed reduction, and high applied torque. Assuming the speed of input shaft 14 to be constant further turning of the control crank 76 progressively increases the speed of driven member 12 and decreases the applied torque. When the discs 51 have been turned to parallelism with input shaft 14, a one to one ratio exists and the members 11 and 12 turn at equal angular velocities. Further rotation of the crank 76 in the same sense produces a progressively greater ratio of speed step up. Thus the transmission is readily passed from neutral, through a wide range of speed reductions, to the equivalent of direct drive and through a correspondingly wide range of speed step up. The range of speed ratios which can be obtained is fixed by the ratio of the internal diameter of the toroidal chamber formed by grooves 18 relative to the external diameter of the toroid, a decrease in this ratio producing a greater range of speed ratios. Since this ratio is independent of the absolute size of the toroid, designing the apparatus for extreme speed ratio ranges does not necessarily require an increase in the size of the transmission. It should be observed that substantially all the torque transmitting mechanism, with the exception of the control means, is contained within the driving and driven members. Thus no housing or cowling need ordinarily be used.

Referring now to Figure 6, there is shown a second embodiment of the invention adapted for extreme degrees of speed reduction and in which two stages of speed reduction are used. Apparatus of this type is typically used with electrical motors which ordinarily turn at speeds very much greater than the speed of the load to be driven.

The driving member 78, in this embodiment, comprises a circular rotary element having a flat face 79 with an axial well 81 into which an end of a drive input shaft may be keyed. The opposite side of driving member 78 tapers toward the axis along a curve which is a quarter circle in cross section, the lateral surface 82 of the member thus having the shape of one quarter of a toroid. The toroidal surface 82 terminates at a flat circular face 83 parallel to and opposite from face 79, a relatively long shaft section 84 being extended axially from the center of face 83.

Disposed coaxially on shaft section 84, for rotation thereon, is an intermediate drive member 86. The face of intermediate member 86 adjacent drive member 78 has an annular concavity 87 which concavity is coaxial with shaft 84, the radially outermost surface 88 of the concavity having a contour which is quarter circular in cross section and which forms the opposing section of the toroid formed by surface 82 of driving member 78. Disposed coaxially on shaft section 84, between driving member 78 and intermediate drive member 86 is an axle support element 33 mounting four pivot axles 44 which in turn carry torque transfer discs 51. The foregoing torque transfer mechanism is identical in all respects to that previously described in connection with the first embodiment as shown in Figures 1 to 5, and therefore will not be described in detail here. Such mechanism includes a control rod 48' which connects with a stationary control mechanism and crank as previously described and as shown in Figures 1.

Referring now again to Figure 6, it may be seen that the side of intermediate member 86 opposite from concavity 87 tapers inward towards the axis of the member along a quarter circular curve forming a quarter toroidal surface 89 identical to surface 82 of driving member 78. Such surface 89 terminates at a flat circular face 91 normal to the axis of the member 86.

Also disposed coaxially on shaft section 84, for rotation thereon, is a cylindrical driven member 92 having, on the face adjacent intermediate member 86, an annular concavity 93 which concavity is coaxial with the shaft section 84 and which has a radially outermost surface 94 of quarter circular cross section. Concavity 93 is thus identical to concavity 87 of intermediate member 86 and forms the opposing quarter surface of the toroid defined by surface 89 of the intermediate member. An axle support element 33 mounting four pivot axles 44 with torque transfer discs 51 is disposed coaxially on shaft section 84 between intermediate member 86 and the driven member 92, the elements again being identical in all respects to such mechanism as previously described. To lock the foregoing rotary elements on the shaft 84, an annular washer 96 is coaxially seated in an annular groove 97 circumscribing the end portion 98 of the shaft immediately adjacent the end surface 99 of driven member 92. For purposes of transmitting drive to a load, the driven member 92 is, in this embodiment, provided with a peripheral V-groove 101 suitable for engaging a standard V-belt.

Since speed ratio changes of the magnitude producible with the two-stage embodiment of the invention described above are more commonly utilized where speed reduction is required, as opposed to speed step-ups, the above described embodiment is designed to be limited to this type of application. It will be understood, however that such multistage construction can equally well be used where speed step-up, or speed reduction changeable to speed step-up, are required. Such construction is achieved by altering the driving member 78, intermediate member 86 and driven member 92, to complete the toroidal chambers defined in part by the surfaces 82, 88, 89, and 94, the structure of the driving and driven members then being substantially that of the driving and driven members of the first embodiment. Where solely speed step-up is required, the apparatus can be reversed, driven member 92 serving as the drive input and driving member 78 serving as the output.

Thus while the invention has been disclosed with respect to two representative embodiments, it will be apparent to those skilled in the art that numerous variations and modifications may be made within the spirit and scope of the invention and thus it is not intended to limit the invention except as defined in the following claims.

What is claimed is:

1. In a variable torque transmission, the combination comprising a first and second rotary cylinder constituting a driving member and a driven member respectively, said first and second rotary cylinders being positioned on a common axis and being provided with matching coaxial grooves defining a toroidal chamber between said members, a stationary axle support element disposed between said first and second rotary cylinders in coaxial relationship therewith, said axle support element being provided a plurality of radial spokes, a plurality of rotary axles disposed within said toroidal chamber each extending between an adjacent pair of said spokes of said support element, bevel gear means secured to each end of each said axle and coupling said axles for concurrent rotation, a control rod formed by an extension of one of said axles projecting from between said cylinders and coupled to selectively rotate said axles, the distal end of said control rod being provided with means to effect rotation thereof and being free from rigid restraint with respect to pivoting movement about the axis of said cylinders, a plurality of rotary torque transfer discs one mounted on each said axle in parallel alignment therewith, said discs having a diameter substantially equal to that of said toroidal chamber whereby said discs bear against said first and second rotary cylinders and transfer drive therebetween at a drive ratio determined by the rotational position of said axles, a stabilizing rod constituting an extension of one of said axles which rod projects from between said first and second cylinders, and a stationary bearing into which said stabilizing rod is journaled.

2. In a variable torque transmission, the combination comprising a pair of rotary cylinders constituting a driving member and a driven member, said pair of rotary cylinders being positioned with a common axis and being provided with opposed coaxial grooves defining a toroidal chamber between said members, a stationary spoked axle support element disposed between said rotary cylinders in coaxial relationship thereto, a plurality of axles disposed within said toroidal chamber between adjacent spokes of said axle support element, gear means interconnecting said axles for simultaneous rotation, a plurality of rotary torque transfer discs one mounted on each said axle in parallel alignment therewith, said discs having a diameter equal to that of said toroidal chamber whereby said discs bear against each of said pair of rotary cylinders and transfer torque therebetween, a control rod extending from between said cylinders and connected to said axles for effecting rotation thereof, a stabilizing rod extending from between said cylinders and aligned in parallelism therewith, said rod being attached to said axle support element and being an extension of one of said axles, and a stationary element situated exteriorly of said cylinders and provided with a slot which slot is elongated in a direction parallel to the axis of said cylinders and through which one end of said stabilizing rod projects whereby said axle support element is prevented from undergoing rotary motion but is free to undergo limited motion parallel to the axis of said cylinders.

3. In a variable torque transmission, the combination comprising a first and second rotary cylinder constituting a driving member and a driven member respectively, said first and second rotary cylinders being positioned on a common axis and being provided with matching coaxial grooves defining a toroidal chamber between said members, an axle support element disposed between said first and second cylinders in coaxial relationship therewith which support element is provided with four equiangularly spaced radial spokes, each said spoke of said support element being forked at the outer extremity and being provided with an opening at the base of said forked extremity, four rotary axles disposed between said first and second cylinders each extending between adjacent ones of said spokes and being journalled in said forked extremities thereof to form a rectangular framework of axles mounted on said support element and centered on the axis of said first and second cylinders, a plurality of bevel gears one secured coaxially on each end portion of each said axle and positioned to mesh with a neighboring one of said gears through said openings in said spokes whereby all said axles are constrained to rotate in synchronism, four rotary torque transfer discs one mounted on each said axle in parallel alignment therewith and having a diameter substantially equal to that of said toroidal chamber whereby said discs bear against said first and second cylinders and transfer drive therebetween, a control rod coupled to one of said axles and extending exteriorly of said cylinder, a bearing formed of resilient material into which the end of said control rod is journaled whereby said rod is not restrained from limited lateral movements, a stabilizing rod connected to said axle support element and extending exteriorly of said cylinders, and a stationary means restricting motion of said stabilizing rod whereby said axle support element is prevented from rotating, said stationary means being situated exteriorly of said cylinders.

References Cited in the file of this patent
UNITED STATES PATENTS

| | | |
|---|---|---|
| 1,024,742 | Nettenstrom | Apr. 30, 1912 |
| 2,425,188 | Honigman | Aug. 5, 1947 |

FOREIGN PATENTS

| | | |
|---|---|---|
| 628,460 | France | June 27, 1927 |
| 5,235 1907 | Great Britain | Feb. 27, 1908 |
| 341,376 | Italy | June 23, 1936 |